United States Patent
Kokura

(10) Patent No.: US 12,159,371 B2
(45) Date of Patent: Dec. 3, 2024

(54) IMAGE PROCESSING APPARATUS, IMAGE FORMING SYSTEM, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Toru Kokura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 373 days.

(21) Appl. No.: 17/667,581

(22) Filed: Feb. 9, 2022

(65) Prior Publication Data
US 2022/0292640 A1  Sep. 15, 2022

(30) Foreign Application Priority Data
Mar. 9, 2021 (JP) .................. 2021-037643

(51) Int. Cl.
*G06T 5/00* (2024.01)
*G06T 5/50* (2006.01)
*G06V 10/60* (2022.01)

(52) U.S. Cl.
CPC ............ *G06T 5/00* (2013.01); *G06T 5/50* (2013.01); *G06V 10/60* (2022.01); *G06T 2207/20084* (2013.01)

(58) Field of Classification Search
None
See application file for complete search history.

(56) References Cited

U.S. PATENT DOCUMENTS

| | | | |
|---|---|---|---|
| 9,230,509 B2* | 1/2016 | Van Der Vleuten | G06T 3/10 |
| 9,917,987 B2* | 3/2018 | Bryant | H04N 1/407 |
| 11,200,643 B2 | 12/2021 | Kokura | |
| 2003/0007687 A1* | 1/2003 | Nesterov | H04N 1/624 |
| | | | 382/167 |
| 2006/0038891 A1* | 2/2006 | Okutomi | H04N 23/843 |
| | | | 348/222.1 |
| 2006/0227227 A1* | 10/2006 | Tsuruoka | H04N 25/134 |
| | | | 348/E5.079 |
| 2007/0132864 A1* | 6/2007 | Tsuruoka | G06T 5/70 |
| | | | 348/E5.079 |
| 2020/0258196 A1 | 8/2020 | Kokura | |
| 2021/0358081 A1 | 11/2021 | Kokura | |
| 2021/0398247 A1 | 12/2021 | Kokura | |

(Continued)

OTHER PUBLICATIONS

Park et al., "High Dynamic Range and Super-Resolution Imaging From a Single Image," IEEE Access vol. 6, Jan. 23, 2018 (Year: 2018).*

(Continued)

*Primary Examiner* — Soo Shin
(74) *Attorney, Agent, or Firm* — Carter, DeLuca & Farrell LLP

(57) ABSTRACT

There is provided with an image processing apparatus that generates learning data for use in machine learning using a model. An obtaining unit is configured to obtain a first image for use in learning by the model. A generating unit is configured to, in a case where a first luminance of the first image is greater than a threshold, generate a second image with a second luminance different to the first luminance.

4 Claims, 12 Drawing Sheets

(56) References Cited

U.S. PATENT DOCUMENTS

2022/0239822 A1* 7/2022 Genov ................... G01S 17/894
2022/0292640 A1* 9/2022 Kokura .................. G06V 10/82
2022/0392030 A1* 12/2022 Bogdanowicz .......... G09G 5/06

OTHER PUBLICATIONS

Yeh et al., "Robust 3D Reconstruction Using HDR-Based SLAM," IEEE Access vol. 9, Jan. 13, 2021 (Year: 2021).*
Michael Gharbi et.al, "Deep Joint Demosaicking and Denoising" Siggraph Asia 2016 (Nov. 2016) pp. 1-12, vol. 35, No. 6.

* cited by examiner

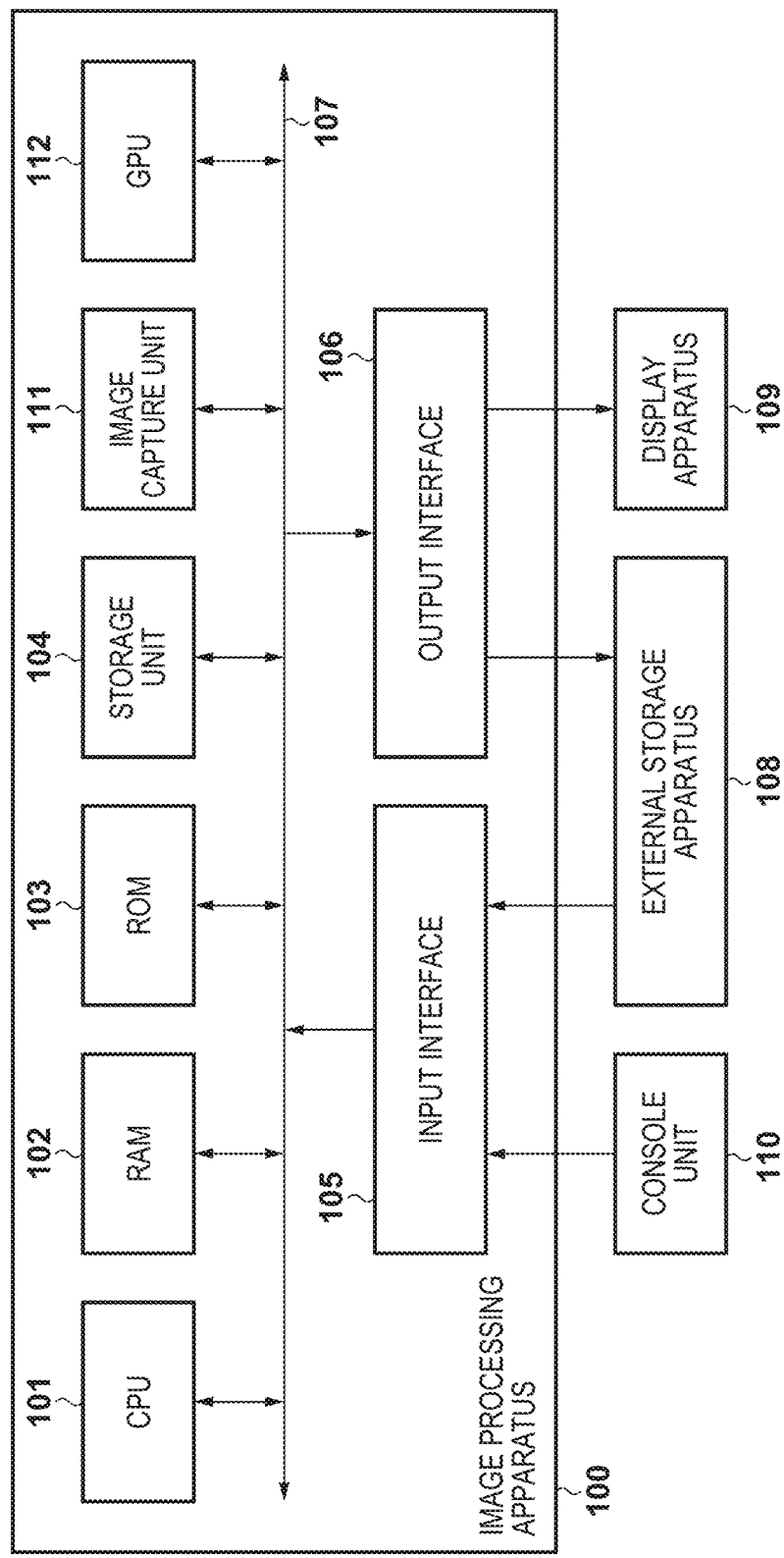

FIG. 9
ORIGINAL PIXEL VALUE RANGE — 901
PIXEL VALUE RANGE OF SUPERVISORY IMAGE AFTER EXTENDING — 902
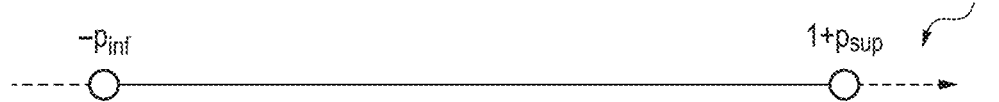
PIXEL VALUE RANGE OF INPUT IMAGE AFTER SHORTENING — 903
PIXEL VALUE RANGE OF SUPERVISORY IMAGE BEFORE AND AFTER EXTENSION (ZERO POINT IS UNCHANGED) — 904
905
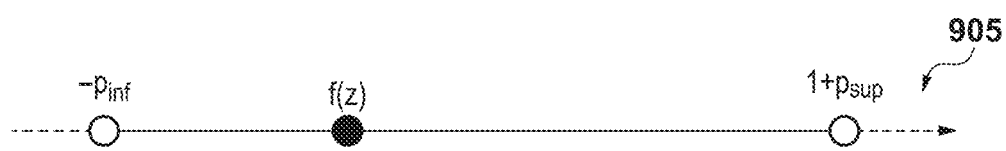

IMAGE PROCESSING APPARATUS, IMAGE FORMING SYSTEM, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image forming system, an image processing method, and a non-transitory computer-readable storage medium.

Description of the Related Art

In an image sensor used in an image capture apparatus such as a digital camera, an RGB three primary color filter is installed above the pixels, for example. This allows each pixel to receive a specific wavelength of light component. The Bayer array is an example of an RGB color filter array placed above the pixels. An image captured using the Bayer array is composed of pixels each with RGB color information, i.e., a mosaic image. A development processing unit of an image capture apparatus executes a demosaic process to obtain a color image from the mosaic image obtained by the image sensor. In the demosaic process, a linear filter is used on the RGB pixels on the mosaic image. This allows the RGB color information missing from the RGB pixels to be interpolated using the surrounding RGB pixels of each RGB pixel. The linear interpolation method for interpolating color information has low interpolation accuracy. Thus, many non-linear interpolation methods have been proposed. However, with many non-linear interpolation methods, there is an image region for which the color information cannot be completely interpolated. Thus, such demosaic processes have had problems including the occurrence of false color and artifacts.

There is a data-driven interpolation method that uses deep learning technology in the demosaic process. The method uses supervisory images with low noise to train a demosaic network based on a convolutional neural network (referred to below as CNN). In this method, pixel values of the supervisory image are set to within a section with a minimum of 0 and a maximum of 1 to normalize the pixel values (Michael Gharbi et.al. "Deep Joint Demosaicking and Denoising", Siggraph Asia 2016). This section is called the pixel value range. The image processing apparatus uses the supervisory images including pixel values normalized within the pixel value range to teach the feature of the supervisory image to the CNN. The image processing apparatus inputs a mosaic image (input image) to the CNN trained with the supervisory images, and the CNN executes inference (outputs) to convert the mosaic image to an RGB image. Inference may also be called estimation.

SUMMARY OF THE INVENTION

The present invention in its one aspect provides an image processing apparatus that generates learning data for use in machine learning using a model, the image processing apparatus comprising an obtaining unit configured to obtain a first image for use in learning by the model, and a generating unit configured to, in a case where a first luminance of the first image is greater than a threshold, generate a second image with a second luminance different to the first luminance.

The present invention in its one aspect provides an image processing method executed by an image processing apparatus that generates learning data for use in machine learning using a model, the image processing method comprising obtaining a first image for use in learning by the model, and generating a second image with a second luminance different to the first luminance in a case where a first luminance of the first image is greater than a threshold.

The present invention in its one aspect provides a non-transitory computer-readable storage medium storing a program that, when executed by a computer, causes the computer to perform an image processing method, the non-transitory computer-readable storage medium comprising obtaining a first image for use in learning by the model, and generating a second image with a second luminance different to the first luminance in a case where a first luminance of the first image is greater than a threshold.

Further features of the present invention will become apparent from the following description of exemplary embodiments (with reference to the attached drawings).

BRIEF DESCRIPTION OF THE DRAWINGS

FIG. 1 is a configuration diagram of an image forming system according to the present embodiment.

FIG. 9 is a diagram for describing a pixel value range according to the present embodiment.

DESCRIPTION OF THE EMBODIMENTS

Figure 2A:
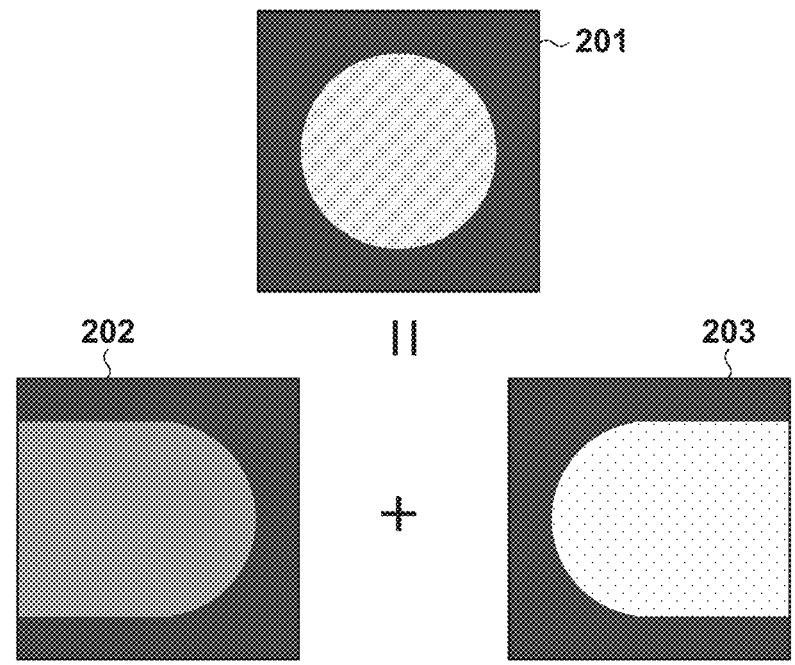
FIG. 2A is a diagram for describing the generation of an inference image by a CNN according to the present embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

According to the present invention, color degradation that occurs in the image demosaic process can be suppressed, and the quality of the color in the image can be improved.

FIG. 1 is a diagram illustrating an example of an image forming system 10 according to the first embodiment. The image forming system 10 includes an image processing apparatus 100, a console unit 110, an external storage apparatus 108, and a display apparatus 109. The image processing apparatus 100 includes a CPU 101, a RAM 102, a ROM 103, a storage unit 104, an input interface 105, an output interface 106, an image capture unit 111, and a GPU 112. The components of the image processing apparatus 100 are connected to one another via a bus 107. Also, the image processing apparatus 100 is connected to the external storage apparatus 108 and the console unit 110 via the input interface 105. The image processing apparatus 100 is also connected to the external storage apparatus 108 and the display apparatus 109 via the output interface 106.

The CPU 101 is a processor such as a central processing unit and controls the overall operations of the image forming system 10 by executing computer programs stored on the RAM 102 and the ROM 103 described below. Note that in this example, the CPU 101 controls entire image forming system 10. However, the entire image forming system 10 may be controlled by a plurality of pieces of hardware (not illustrated) sharing the processing relating to control.

The RAM 102 is a working main memory and includes a storage area for temporarily storing computer programs and data read from the storage unit 104 and data received from an external source via the input interface 105. Also, the RAM 102 is used as a storage area for when the CPU 101 executes various types of processing and as a storage area for when the GPU 112 executes image processing. The ROM 103 is a readable memory and includes a storage area for storing setting parameters for each unit in the image forming system 10, a boot program, and the like.

The storage unit 104 is a large-capacity information storage device such as a hard disk drive (HDD), for example. The storage unit 104 may be a storage device such as an optical disk drive, a flash memory, and the like. The storage unit 104 stores an operating system (OS) and computer programs and data for the CPU 101 to execute various types of processing. Also, the storage unit 104 temporarily stores data (for example, input and output image data, image conversion information from the GPU 112, and the like) generated by the processing of the components of the image forming system 10. The computer programs and data stored in the storage unit 104 are read as appropriate in accordance with control by the CPU 101 and stored in the RAM 102.

The input interface 105 is a serial bus interface such as USB, IEEE 1394, or the like. The CPU 101 receives data, commands, and the like from an external apparatus (not illustrated) via the input interface 105. In the present embodiment, the CPU 101 obtains data from the external storage apparatus 108 via the input interface 105.

The output interface 106 has a configuration similar to that of the input interface 105 and is a serial bus interface such as USB, IEEE 1394, or the like. Note that the output interface 106 may be a video output terminal such as DVI, HDMI (registered trademark), or the like. The image processing apparatus 100 outputs data and the like to an external apparatus (not illustrated) via the output interface 106. The CPU 101 outputs processed image data to the display apparatus 109 via the output interface 106.

The bus 107 is a data transmission line for data exchange between the components in the image forming system 10. The components of the image forming system 10 are all connected via the bus 107, and, for example, the CPU 101 can transmit and receive data to and from the ROM 103 via the bus 107.

The external storage apparatus 108 is a storage medium such as an HDD, a memory card, a CF card, an SD card, a USB memory, or the like. The external storage apparatus 108 can store various types of data stored by the storage unit 104. The display apparatus 109 is, for example, a CRT display, a liquid crystal display (LCD), or the like for displaying images, characters, and the like as the result of various types of processing by the CPU 101. Note that the display apparatus 109 may be integrally formed with the image processing apparatus 100 and may be provided with a touch panel a user can operate via touch. Also, the display apparatus 109 may function as a part of the console unit 110.

The console unit 110 is an input apparatus such as a mouse and keyboard or the like and receives user instructions. Also, the CPU 101 obtains user instruction input to the console unit 110 via the input interface 105. The image capture unit 111 captures an input image for processing by the image processing apparatus 100. The image capture unit 111 is provided with an image sensor (for example, a CCD, CMOS, or the like) for capturing a stored image formed on the recording medium, for example. The GPU 112 is a processor for executing image processing of the image obtained by the image capture unit 1. The GPU 112 performs calculations using the data as per a processing command from the CPU 101 and outputs the result to the CPU 101. The CPU 101 writes the data to the storage unit 104 via the bus 107 and reads out the data stored in the storage unit 104.

Hereinafter, a convolutional neural network (CNN) generally used in image processing technology using deep learning technology will be described in relation to the present embodiment. The CNN is a learning-type of image processing technique that convolves a filter generated by training or learning with an image and then repeats a nonlinear calculation. The CNN is also called a model. The filter is a detector for extracting features of the image and is also called a local receptive field. The image obtained by convolving the filter with an image and by performing the non-linear calculations is called a feature map. Also, the learning by the CNN is executed using learning data including pairs of input images and output images. Specifically, the learning by the CNN includes generating a filter value (parameter) that can be used in highly accurate conversion to obtain an output image from an input image and correcting the parameter.

In a case where the image color information includes RGB color channels or a case where the feature map is made of a plurality of images, the filter used in the convolution operation includes a plurality of channels corresponding to the number of channels or the number of images. In other words, the convolution filter is expressed by a four-dimensional array including a vertical and horizontal size, a number of images, and a number of channels. The non-linear calculation processing after the filter is convolved with the image (or the feature map) is expressed in units called layers. For example, it is called an n-th layer feature map or an n-th layer filter. Also, for example, a CNN that repeats filter convolution and the non-linear calculation three times has a three-layer network structure. This processing is represented by Formula 1 below $$X_n^{(l)} = G\left(\sum_{k=1}^{K} W_n^{(l)} * X_{n-1}^{(l)} + b_n^{(l)}\right)$$ Formula 1

In Formula 1, $W_n$ is an n-th layer filter, $b_n$ is an n-th layer bias. G is a non-linear operator, $X_n$ is an n-th layer feature map, and * is a convolution operator. Note that (1) in the right shoulder of each parameter represents an l-th filter or feature map. The filter and the bias are generated by learning described below and are collectively referred to as network parameters. The non-linear calculation uses, for example, a sigmoid function or rectified linear unit (ReLU). ReLU is a function which, with an input value of 0 or less, always gives an output value of 0 and, with an input value greater than 0 gives an output value of a value equal to the input value. ReLU is represented by Formula 2 below.

$$G(X) = \begin{cases} X & \text{if } 0 \le X \\ 0 & \text{otherwise} \end{cases}$$ Formula 2

In Formula 2, X is the input value and G(X) is the output value. Next, the learning by the CNN will be described. The learning by the CNN includes minimizing an objective function represented by Formula 3 below using learning data including pairs of input images for learning and corresponding output images $$L(\theta) \frac{1}{n} \sum_{i=1}^{n} \|F(X_i; \theta) - Y_i\|_2^2$$ Formula 3

Formula 3 is a loss function for measuring an error between the input value and the output value. In Formula 3, $X_i$ is an i-th input learning image data, and $Y_i$ is an i-th output learning image data. F is a function collectively representing the calculations using Formula 1 for each layer of the CNN. θ is a network parameter (including the filter and the bias). $\|F(X_i; \theta - Y_i\|2$ is an L2 norm, which is a square root of the sum of squares of the vector elements of F and $Y_i$, n is the total number of images in the learning data for use in the learning. Typically, because the total number of images in the learning data is large, the stochastic gradient descent method uses, in the learning by the CNN, a portion of the images selected at random from the images for learning. Accordingly, the calculation load when the CNN is trained with a large amount of learning data is reduced. Also, known examples of an objective function minimization (optimization) method include the momentum method, the AdaGrad method, the AdaDelta method, and the Adam method, for example. Also, it is known that there is a difference in the learning time of the CNN between methods due to a difference in convergence between methods. Note that any one of the methods described above may be used as the optimization method in the learning of the CNN. The Adam method is represented by Formula 4 below.

$$g = \frac{\partial L}{\partial \theta_i^t}$$ Formula 4

$$m = \beta_1 m + (1 - \beta_1)g$$

$$v = \beta_2 v + (1 - \beta_2)g^2$$

$$\theta_i^{t+l} = \theta_i^t - \alpha \frac{\sqrt{1 + \beta_2^t}}{(1 - \beta_1^t)} \frac{m}{(\sqrt{v} + \varepsilon)}$$

In Formula 4, $\theta_i^t$ is an i-th network parameter at the t-th iteration, and g is a gradient of a loss function L with respect to $\theta_i^t$. Also, m and v are moment vectors, a is a base learning rate, β1 and β2 are hyper parameters, and s is a small constant. Known examples of a network used in the CNN are ResNet in the image recognition field and RED-Net in the super-resolution field. In both networks, many layers, convolutional layers and pooling layers, are provided in the CNN, and a filter convolution is iterated many times. Accordingly, both networks improve the accuracy of the learning by the CNN. For example, ResNet includes a network structure provided with a route that shortcuts the convolutional layer, thereby realizing a multilayer network with as many as 152 layers and realizing highly accurate recognition close to that of the human recognition rate. Note that many layers are provided in the CNN to improve the accuracy of the learning by the CNN because the nonlinear relationship can be accurately expressed between input and output by repeating the non-linear calculation many times.

Figure 2B:
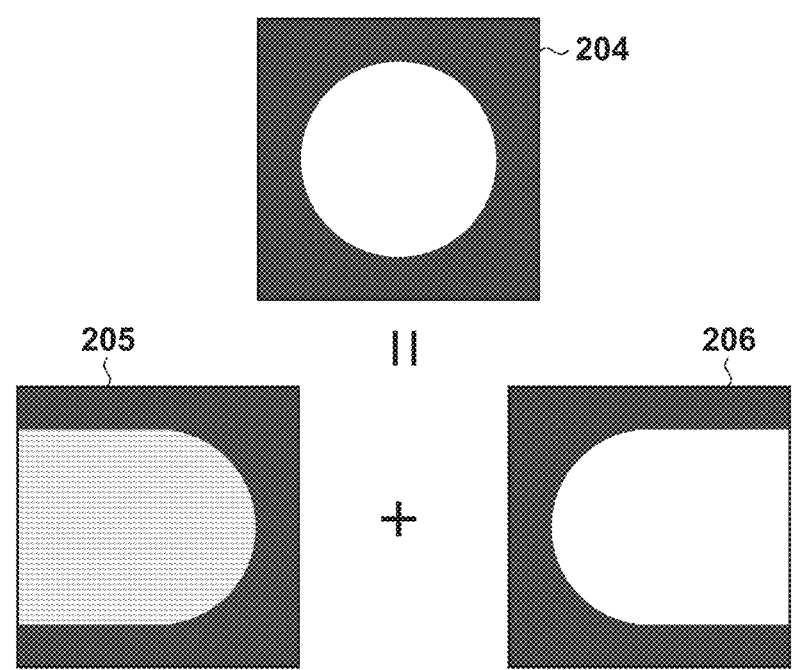
FIG. 2B is a diagram for describing the generation of an inference image by the CNN according to the present embodiment.

Hereinafter, the theory behind why artifacts occur in known technology will be described with reference to FIGS. 2A and 2B and FIG. 3. An artifact is a data error or a signal distortion that occurs in the demosaic process. The demosaic process is a process for interpolating color information using the pixel values obtained by the RGB color filters. To describe the theory behind why artifacts occur, inference (a process of calculating an output image from an input image) in the demosaic process of the CNN will be described. FIGS. 2A and 2B are diagrams illustrating how an output image is inferred by the CNN using an input image. As illustrated in FIG. 2A, an image 201 is the output image inferred by the CNN, and the output image includes a circle in the central portion of the image. An image 202 and an image 203 are input images for input to the CNN. The image 202 includes a shape that is the combination of a right semicircle and a rectangle, and the image 203 includes a shape that is the combination of a left semicircle and a rectangle. The image 201 is obtained by combining the image 202 and the image 203. An image 204 of FIG. 2B is obtained by combining an image 205 and an image 206. The details of FIG. 2B are similar to that of FIG. 2A, and thus description thereof will be omitted.

Firstly, the image processing apparatus 100 trains the CNN (not illustrated) for demosaic process using learning data including a large quantity of images. At this time, the CNN stores the learned learning data in the storage unit 104, for example. Accordingly, the learned CNN is capable of executing inference to obtain an output image from an unlearned input image using the learning data. An example of the CNN inferring an output image using an input image (for example, the image 202 and the image 203) will now be described. Herein, the expected output image corresponds to the image 201 obtained by executing the demosaic process on the input image. The CNN selects an image with a feature that is similar to that in the image 201 from the learning data stored in the storage unit 104 to generate the image 201.

In a case where the CNN has learned an image that perfectly matches the image 201, the CNN may directly output the learned image. However, in a case where the CNN has not learned an image that perfectly matches the image 201, the CNN selects two or more images (for example, the image 202 and the image 203) similar to the image 201. The CNN obtains the image 201 by combining the two or more images using a method such as alpha blending, for example. Alpha blending (hereinafter, referred to as blending) is a method of giving an image a transparent appearance by multiplying the image by a coefficient (a value). The CNN can express the color of the circle illustrated in image 201 by blending the foreground colors of the image 202 and the image 203. Note that the inference process executed by the CNN to output the image 204 of FIG. 2B is similar to that for the image 201, and thus description thereof will be omitted.

Figure 3:
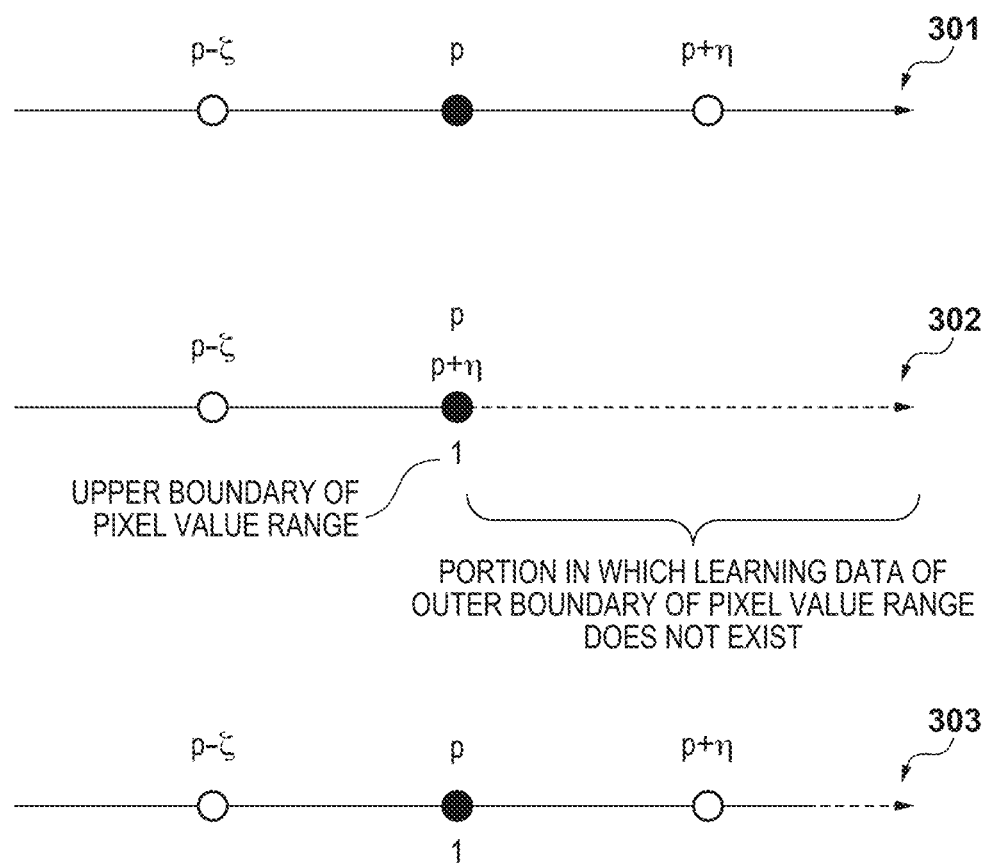
FIG. 3 is a diagram for describing the theory behind the occurrence of artifacts in known technology.

FIG. 3 is a diagram for describing the pixel value range of an image. FIG. 3 includes a pixel value range 301, a pixel value range 302, and a pixel value range 303. The blend method for expressing the color of the circle of image 201 will be described using the pixel value range 301. To express a pixel value p with the color of the circle of image 201, the CNN blends a pixel value (p−ζ) with the color of the foreground of the image 202 and a pixel value (p+η) with the color of the foreground of the image 203 at a ratio of (α:β). Here, the ratio α is the ratio of how much the foreground color of the image 202 is blended, and the ratio β is the ratio of how much the foreground color of the image 203 is blended. The ratio of how much the foreground color of the image 202 and the foreground color of the image 203 are blended, a difference η between the pixel value p and the pixel value of the image 202, and a difference ζ between the pixel value p and the pixel value of the image 203 are represented by α:β=ηζ). Herein, the conditions are ζ is positive (ζ>0) and η is positive (η>0).

Returning to the description of FIG. 2B, the inference process of the CNN in a case where the pixel value is saturated as with the color of the circle of the image 204. Pixel value saturation indicates a high luminance state where the pixel value roughly matches 1 or the upper boundary of the pixel value range. To output the pixel value p of the image 204, the CNN selects, as the pixel similar to the image 204, the image 205 with a pixel value (p−ζ) of a dark foreground and the image 206 with a pixel value (p+η) with the foreground pixel value roughly matches 1. Next, the pixel value range 302 in FIG. 3 indicates the relationship between the pixel values of the image 204, the image 205, and the image 206. In the pixel value range 302, because the pixel value p of the image 204 and the pixel value (p+η) of the foreground color of the image 206 equal 1, the difference between the pixel value p and the pixel value (p+η) is 0. Here, the ratio α at which the foreground color of the image 206 is blended is 0. However, in order to express the pixel value p with the color of the circle of the image 204, the CNN must blend the pixel value (p+η) of the foreground color of the image 206. Here, the ratio α of the foreground color of the image 205 must be positive (α>0). As a result, the CNN cannot determine a value for the ratio β of the foreground color of the image 205 and thus fails to output the pixel value p of the image 204. Specifically, the CNN outputs the pixel value p of the image 204 as a pixel value in a case where the ratio α is 0 or alternatively outputs the pixel value p as a pixel value in a case where the ratio α is positive (α>0). In other words, depending on the output result of the pixel value p by the CNN, the pixel value of the region expressing the color of the circle of the image 204 changes, causing variation in the pixel values. The region can be visually recognized by a person as an artifact.

How artifacts are caused will be described below. In a case where the pixel value p and the pixel value (p+η) of the image 206 are 1 in the pixel value range 302, there is no image with a pixel value greater than the pixel value (p+η) (the dashed line region of the pixel value range 302). This means that the pixel value (p+η) of the image 206 for inferring the pixel value p of the image 204 is not in a region of pixel values greater than the upper boundary of the pixel value range 302 used when learning. Regarding this, in the present embodiment, in order for the CNN to infer the pixel value of the output image with high accuracy, a pixel value range that takes into account the output image is used. In the present embodiment, an input image with a pixel value range that exceeds 1 is used by applying gain to the input image used for learning by the CNN. In the present embodiment, so that the pixel value of the output image is included in the pixel value range of the image used when learning, the CNN is trained using an image with an extended pixel value range. Accordingly, with the pixel value range 303 of FIG. 3, the pixel value range of the input image used when learning can include the pixel value p of the output image in the central portion, allowing for less occurrences of artifacts in the output image. Note that here, a method has been described that suppresses the occurrence of artifacts by extending the pixel value range of the input image used when learning. However, before inference, the pixel value range of the input image input to the CNN may be shortened. To describe the present embodiment, the example described above uses a case where the pixel value p of the output image obtained by inference by the CNN is on the upper boundary of the pixel value range used when learning. Note that a similar method may be used in a case where the pixel value p of the output image obtained by inference by the CNN is on the lower boundary of the pixel value range used when learning.

Figure 4:
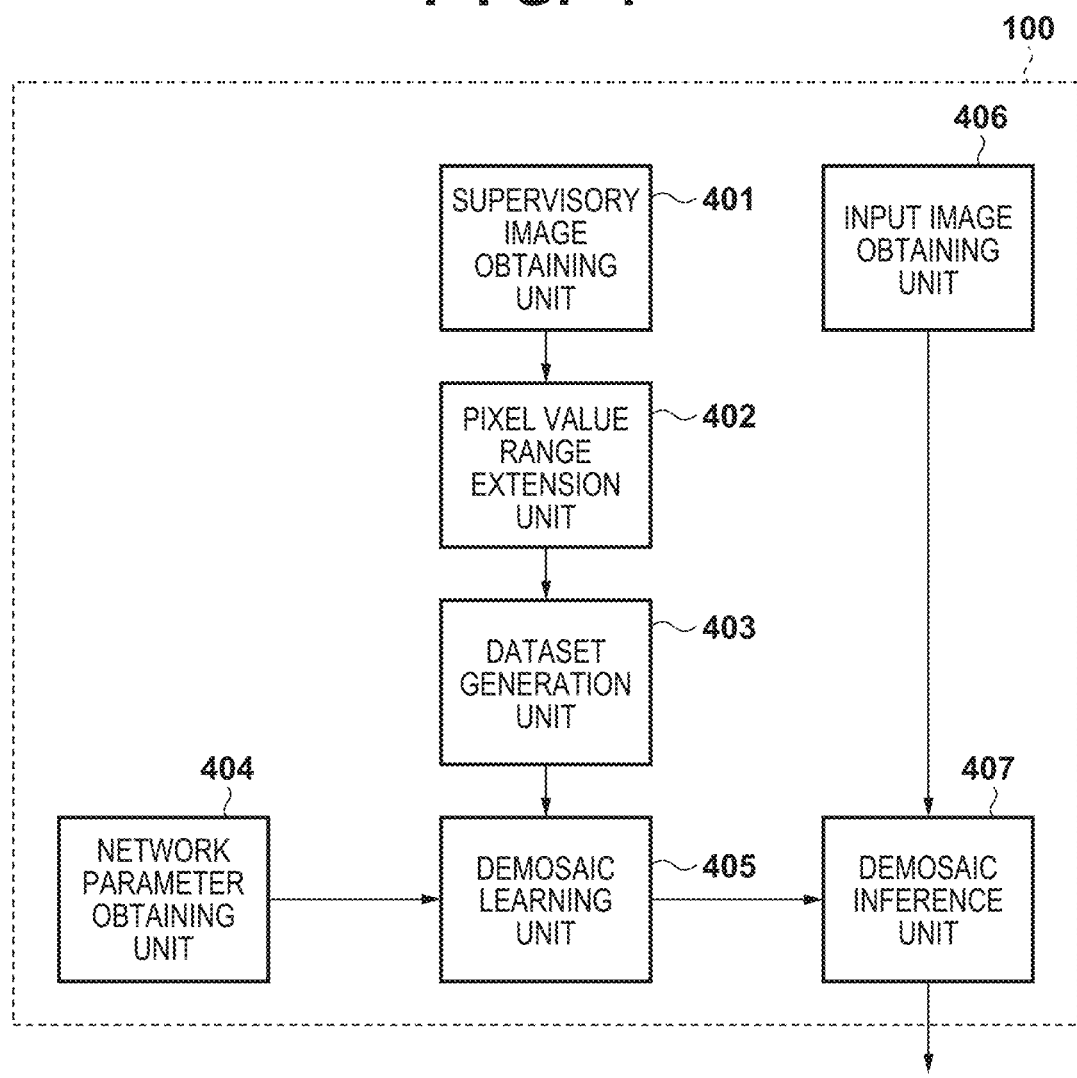
FIG. 4 is a block diagram of an image processing apparatus according to a first embodiment and a second embodiment.

FIG. 4 is a diagram illustrating the configuration of the image processing apparatus 100. The image processing apparatus 100 includes a supervisory image obtaining unit 401, a pixel value range extension unit 402, a dataset generation unit 403, and a network parameter obtaining unit 404. The image processing apparatus 100 further includes a demosaic learning unit 405, an input image obtaining unit 406, and a demosaic inference unit 407. With the configuration of the image processing apparatus 100, for example, one functional unit may be shared and possessed by a plurality of functional units, and two or more functional units may be integrated into a single functional unit. Also, the configuration of the FIG. 4 may be implemented by two or more image processing apparatuses 100. In this case, the plurality of image processing apparatuses 100 are connected via an electric circuit or a wired or wireless network. The plurality of image processing apparatuses 100 are capable of executing the processes by cooperating by communicating data with one another. In the following example, the functional units illustrated in FIG. 4 are described as the subjects of the processes. However, the functions of the functional units are implemented by the CPU 101 executing a computer program corresponding to the functional units of the image processing apparatus 100. Note that the functional units may be implemented via other hardware.

The supervisory image obtaining unit 401 obtains an RGB format supervisory image from the storage unit 104 or the external storage apparatus 108. The pixel value range extension unit 402 is capable of extending the pixel value range of the supervisory image obtained by the supervisory image obtaining unit 401. The dataset generation unit 403 executes subsampling on the supervisory image with an extended pixel value range using an RGB color filter array pattern. Subsampling is a method of reducing the data amount of an image without greatly degrading the image quality by thinning out the color information of the pixels using a certain rule.

The network parameter obtaining unit 404 obtains the network parameter of the CNN to use in the learning of the demosaic process. A network parameter is the coefficient of each filter forming the CNN. The demosaic learning unit 405, using the received network parameter, initializes the weighting coefficient of the CNN and trains the CNN using pairs of supervisory images and pupil images. The input image obtaining unit 406 obtains an input image 801 for executing the demosaic process from the storage unit 104. The demosaic inference unit 407 uses the CNN that has learned using the learning data via the demosaic learning unit 405.

Figure 5:
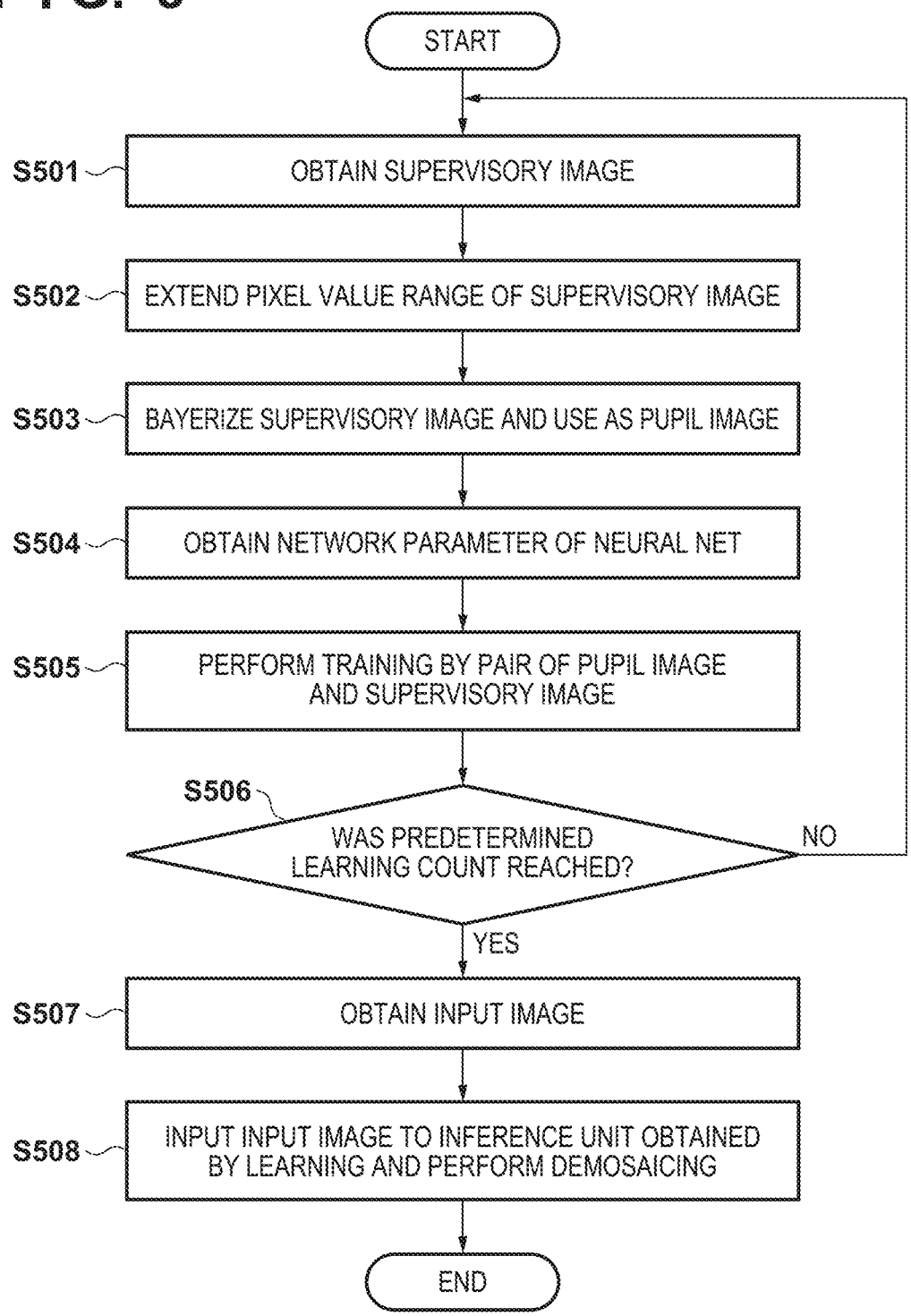
FIG. 5 is a flowchart of an image conversion process according to first embodiment and the second embodiment.
Figure 8:
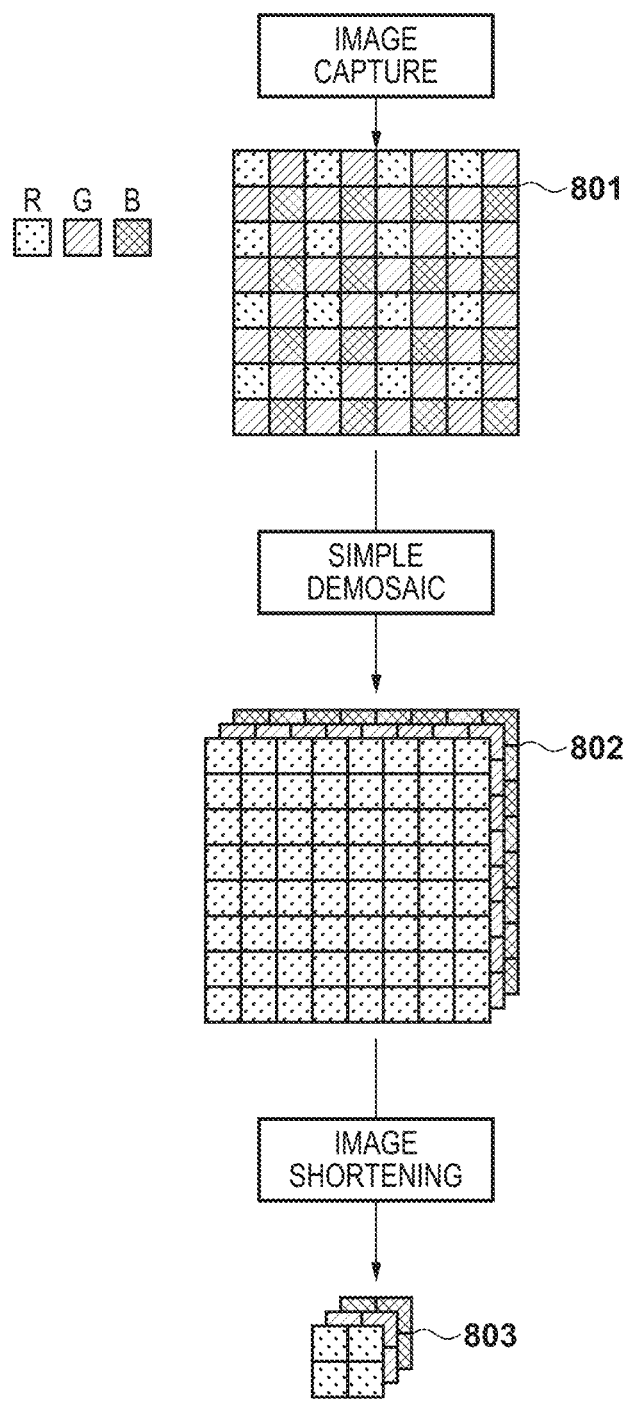
FIG. 8 is a diagram for describing the generation process of a supervisory image according to the present embodiment.

FIG. 5 is a diagram for describing a flow of a series of image processes executed by the functions of the image processing apparatus 100. Hereinafter, an overview of the processes executed by the functions of the image processing apparatus 100 will be described with reference to FIG. 5. In step S501, the supervisory image obtaining unit 401 obtains an RGB format supervisory image 803. The supervisory image is generated in accordance with the method of Non-patent Document 1. Here, FIG. 8 illustrates the main method of obtaining the supervisory image obtaining unit 401. As illustrated in FIG. 8, the image capture unit 111 obtains the input image 801 including RGB, and an RGB image 802 is generated by executing a simple demosaic process on the input image 801. The image capture unit 111 generates the supervisory image 803 by reducing the image of the RGB image 802. The simple demosaic process is bilinear interpolation, but another demosaic process may be used, for example. Also, the color filter array of the present embodiment is a bayer array. However, a color filter array such as X-Trans may be used, for example.

Also, the RGB format supervisory image 803 may be obtained using a method other than the method of Non-patent Document 1. The supervisory image obtaining unit 401, for example, may read out, from the storage unit 104, the supervisory image 803 captured by the image capture unit 111 in advance. Also, the supervisory image obtaining unit 401 may obtain the RGB format supervisory image 803 by capturing an image while changing the position of the image sensor of the image capture unit 111. Next, the supervisory image obtaining unit 401 normalizes the pixel value of the obtained supervisory image 803 to within a pixel value range with a section ranging from 0 to 1 via a method represented by Formula 5 below.

$$x_{norm} = x_{input}/n_{max} \quad \text{Formula 5}$$

Here, $X_{input}$ is the pixel value of the obtained supervisory image 803, $n_{max}$ is the maximum value of the pixel value of $X_{input}$, and $X_{norm}$ is the pixel value of the normalized supervisory image 803. For example, in a case where $X_{input}$ is an 8-bit image, $n_{max}$ is 255, and in a case where $X_{input}$ is a 14-bit image, $n_{max}$ is 16383. The supervisory image obtaining unit 401 transmits the normalized supervisory image 803 to the pixel value range extension unit 402. In step S502, the pixel value range extension unit 402 extends the pixel value range of the received supervisory image 803 in accordance with Formula 6 below.

$$x_{range} = x_{norm}(1 + \rho_{inf} + \rho_{sup}) - \rho_{inf} \quad \text{Formula 6}$$

$$:= f(x_{norm})$$

Here, $X_{range}$ is the pixel value range of the supervisory image 803 after pixel value range extension, $\rho_{inf}$ is the downward extension width of the pixel value range, and $\rho_{sup}$ is the upward extension width of the pixel value range. The conversion formula for obtaining the extended pixel value range is represented by $f(X_{norm})$. Here, FIG. 9 is a diagram illustrating the extension and size relationship of the pixel value ranges of the supervisory image 803. FIG. 9 illustrates a pixel value range 901, a pixel value range 902, a pixel value range 903, a pixel value range 904, and a pixel value range 905. In FIG. 9, the pixel value range 901 of the supervisory image 803 includes pixel values from a minimum value of 0 to a maximum value of 1. The pixel value range 902 obtained by extending the pixel value range 901 includes pixel values from a minimum value of $-\rho_{inf}$ to a maximum value of $1+\rho_{sup}$.

The downward extension width $\rho_{inf}$ and the upward extension width $\rho_{sup}$ may be determined on the basis of a predefined, predetermined value. Also, the extension widths of the pixel value ranges may be extension widths that differ between the supervisory images 803 or may be determined using a random number. The pixel value range extension unit 402 may determine the extension width of the pixel value range on the basis of a feature of the supervisory image 803. The pixel value range extension unit 402, for example, when extending the pixel value range of the supervisory image 803 by the predetermined extension width, calculates the ratio of the pixels that deviate from the section of the pixel values of the supervisory image 803 ranging from 0 to 1. The pixel value range extension unit 402 may determine the extension width on the basis of whether or not the ratio of the pixels that deviate from the pixel value range is greater than a predefined threshold.

In FIG. 9, the pixel value range 904 includes a zero point Z (black point) within the pixel value range ranging from a minimum value of 0 to a maximum value of 1. The pixel value range 905 obtained by extending the pixel value range 904 includes a zero point f(z) (black point) within the pixel value range ranging from a minimum value of $-\rho_{inf}$ to a maximum value of $1+\rho_{sup}$. Here, the pixel value range extension unit 402, when extending the pixel value range, matches the zero point z of the pixel value range 904 and the zero point f(z) of the pixel value range 905 and extends the pixel value range of the pixel value range 904. The zero point is a pixel value in a case where the amount of light received by the image sensor of the image capture unit 111 is 0. To prevent additive noise making the pixel value negative, the zero point is set to a value such that z=1/32, for example. The pixel value range extension unit 402 determines the extension width so that the value of the zero point f(z) after extension of the pixel value range is equal to the zero point z before extension. The pixel value range extension unit 402 determines the upward extension width $\rho_{sup}$ in accordance with Formula 7.

$$\rho_{sup} = \frac{1-z}{z}\rho_{inf} \quad \text{Formula 7}$$

Accordingly, as illustrated in FIG. 9, the pixel value range 904 before extension of the pixel value range and the pixel value range 905 after extension of the pixel value range have the same zero point. As a result, in the present embodiment, the inference accuracy can be improved in regards to pixel values at the boundary (minimum value of 0 or maximum value of 1) of the pixel value range of the supervisory image 803 when inference is executed by the CNN. The pixel value range extension unit 402 transmits the supervisory image 803 with an extended pixel value range to the dataset generation unit 403.

Figure 10:
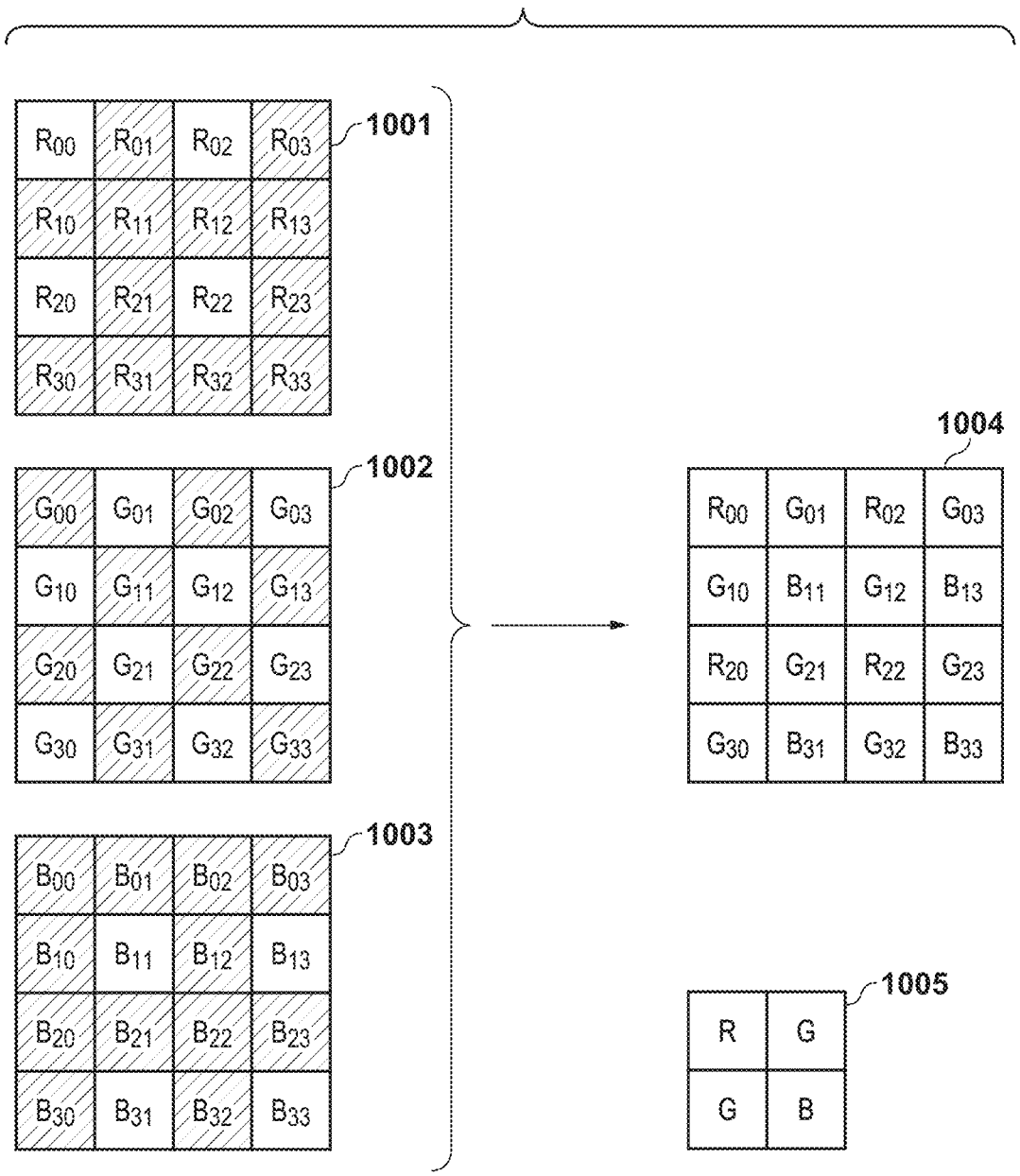
FIG. 10 is a diagram for describing the generation process of an input image according to the present embodiment.

In step S503, the dataset generation unit 403 generates the input image 801 via subsampling by applying a color filter array pattern to the received supervisory image 803. FIG. 10 is a diagram illustrating the flow of generating the input image using the color filter array of the image sensor of the image capture unit 111. As illustrated in FIG. 10, the dataset generation unit 403 obtains a pupil image 1004 by executing subsampling using a color filter array 1005 on an R component 1001, a G component 1002, and a B component 1003 of the supervisory image 803. The dataset generation unit 403 transmits, to the demosaic learning unit 405, an image set including the generated pupil image 1004 and the supervisory image 803.

Returning to the description of FIG. 5, in step S504, the network parameter obtaining unit 404 obtains the network parameter for training the CNN with the demosaic process. The network parameter is set as a random number in accordance with a normal distribution of He. The normal distribution of He is a normal distribution as represented by Formula 8 below, where the average is 0 and the spread is $\sigma_h$.

$$\sigma_h = \sqrt{\frac{2}{m_N}} \quad \text{Formula 8}$$

Figure 11:
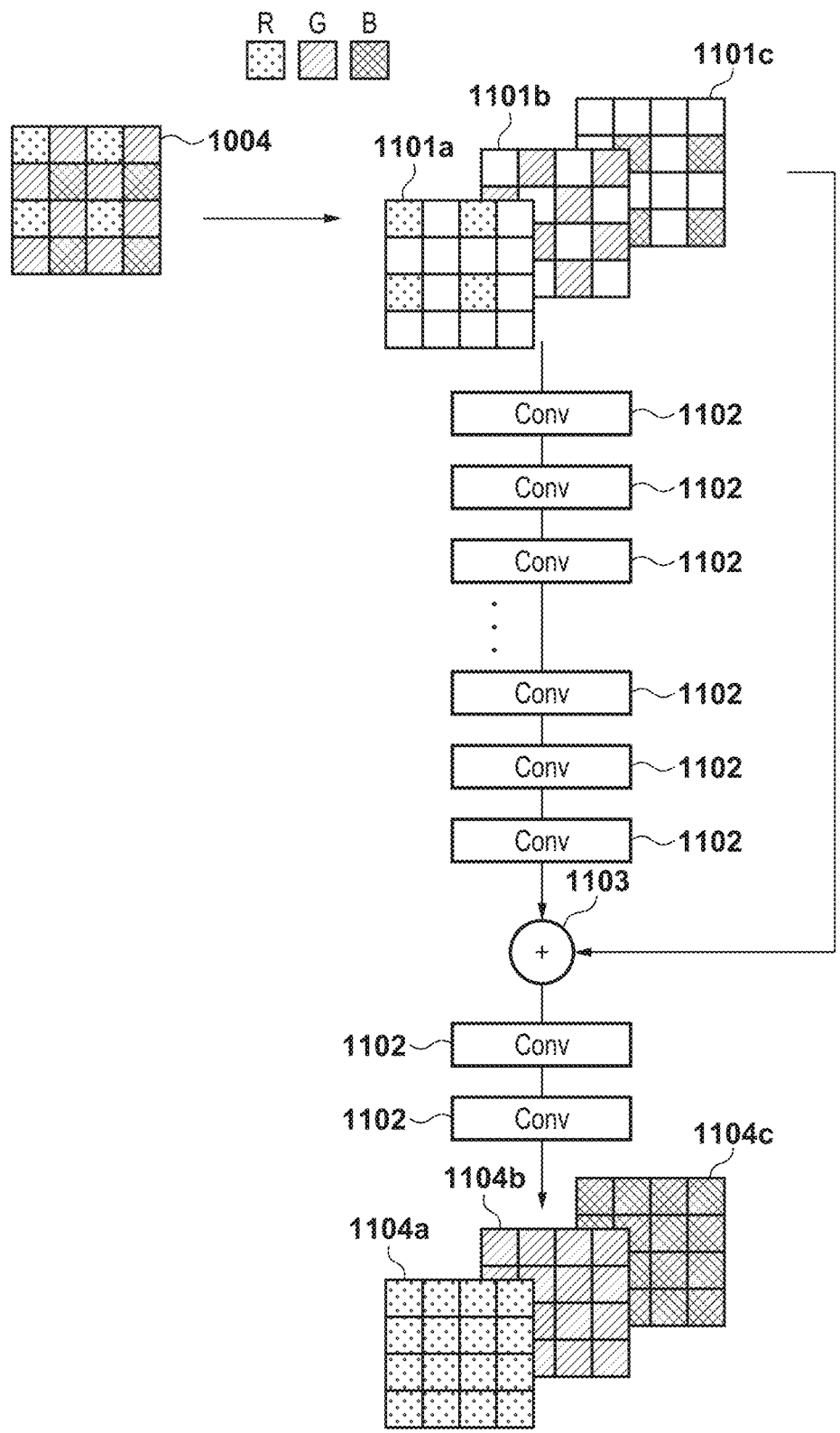
FIG. 11 is a diagram for describing a process of the CNN according to the present embodiment.

Here, $m_N$ is a neuron number in between the layers forming the CNN. Note that the network parameter may be determined by a method other than using Formula 8. The network parameter obtaining unit 404 transmits the obtained network parameter to the demosaic learning unit 405. In step S505, the demosaic learning unit 405 initializes the weighting coefficient of the CNN with the received network parameter and then trains the CNN using the received image set. The demosaic learning unit 405 trains the CNN using the supervisory image 803. FIG. 11 is a diagram illustrating the structure of the CNN and the flow of a learning series according to the present embodiment. As illustrated in FIG. 11, the CNN includes the pupil image 1004, lost images 1101a to 1101c, a filter 1102, a connection layer 1103, and output images 1104a to 1104c. The CNN is provided with a plurality of filters 1102 for executing calculations based on Formula 1. When the pupil image 1004 is input into the CNN, the CNN converts the pupil image 1004 into the lost image 1101a, the lost image 1101b, and the lost image 1101c of three channels (RGB). The R channel lost image 1101a includes only the pixels (colored portion) of the R component of the pupil image 1004, and the pixel value for the other pixel components (GB) are set to 0 (white portion).

The G channel lost image 1101b includes only the pixels (colored portion) of the G component of the pupil image 1004, and the pixel value for the other pixel components (RB) are set to 0 (white portion). The B channel lost image 1101c includes only the pixels (colored portion) of the B component of the pupil image 1004, and the pixel value for the other pixel components (RG) are set to 0 (white portion). Note that regarding the lost images 1101a to 1101c, the lost portion (portion where the pixel value is 0) in each lost image may be have interpolation of the pixel values executed by a method such as bilinear interpolation. Next, the CNN calculates the feature map by sequentially applying the filter 1102 to the lost images 1101a to 1101c.

As illustrated in FIG. 11, the connection layer 1103 connects the calculated feature map and the lost images 1101a to 1101c in a channel direction. In a case where the channel number of the feature map and the lost images is n1 and n2 respectively, the connection result channel number corresponds to n1+n2. The CNN obtains an output image 1104a, an output image 1104b, and an output image 1104c by executing output of the three channels using the filter 1102 on the connection result. The CNN calculates the residual difference between the output images and the supervisory image 803 and calculates the value of the loss function by finding the average of the overall image. The CNN, on the basis of the calculated value of the loss function, updates the network parameter via backpropagation, for example.

After the network parameter is updated, in step S506 of FIG. 5, the CPU 101 determines whether or not learning by the CNN is complete. The CPU 101 uses whether or not the number of learning (updates of the network parameter) iterations is greater than a threshold as the criterion for determining whether or not learning by the CNN is complete. Note that the criterion for determining whether or not learning by the CNN is complete is not limited to this. For example, determining whether or not the residual difference (difference between the supervisory image 803 and the output images) between the network parameter before and after updating is less than a specified value may be used as the criterion. Also, determining whether or not the residual difference between the output images and the supervisory image 803 is less than a specified value may be used as the criterion. In a case where learning by the CNN is not complete, the process returns to step S501, the dataset generation unit 403 generates the next image set, and the demosaic learning unit 405 restarts learning using the image set (No in step S506). In a case where learning by the CNN is complete, the demosaic learning unit 405 transmits the updated network parameter to the demosaic inference unit 407 (Yes in step S506).

In step S507, the input image obtaining unit 406 captures the input image 801 for executing the demosaic process with the image capture unit 111. Note that the input image 801 may be an image captured by the image capture unit 11 in advance or may be stored in the storage unit 104. The input image obtaining unit 406 transmits the obtained input image 801 to the demosaic inference unit 407. In step S508, the demosaic inference unit 407 uses the CNN used by the demosaic learning unit 405. The demosaic inference unit 407 initializes the network parameter of the CNN with the network parameter received from the demosaic learning unit 405. The demosaic inference unit 407 uses the CNN with the updated network parameter and executes inference of the input image 801 in a similar manner to the method used by the demosaic learning unit 405 in training. Accordingly, the demosaic inference unit 407 obtains the output images 1104a to 1104c as the demosaic images.

In the method according to the present embodiment described above, in order to execute accurate inference of the pixel value of the input image 801, the CNN is trained the pixel value range used when learning is extended so that the pixel value of the input image 801 used when inferring is included in the pixel value range used when learning. Note that the pixel value range used when learning may be a pixel value range with its upward or downward boundary extended in a range so that the pixel value used when inferring can be included.

As described above, according to the first embodiment, a first image for use in learning using a model for learning from images on the basis of the luminance of image is obtained. In a case where a first luminance of the first image is greater than a threshold, a second image can be generated as an image with a luminance different to the first luminance. According to the first embodiment, on the basis of the first luminance and a second luminance of the second image, the parameter for learning with the images in the model can be corrected.

Accordingly, color degradation that occurs in the image demosaic process can be suppressed, and the quality of the color in the image can be improved.

Second Embodiment

The differences between the second embodiment and the first embodiment will be described below.

In the first embodiment described above, the CNN is trained with the supervisory image 803 with a pixel value range extended from the pixel value range of the input image 801 used when inferring. In the second embodiment, the CNN is trained using the supervisory image 803 without an extended pixel value range, and then the CNN is trained using the supervisory image 803 with an extended pixel value range. The second embodiment includes a pre-learning using an unextended pixel value range and a main learning using an extended pixel value range. Accordingly, with the second embodiment, CNN learning can be executed to accommodate inference of pixel values that may be on the upper boundary or the lower boundary or in the central portion of the pixel value range. With the second embodiment, the robustness of the inference of the pixel values of the input image 801 can be increased.

Figure 12:
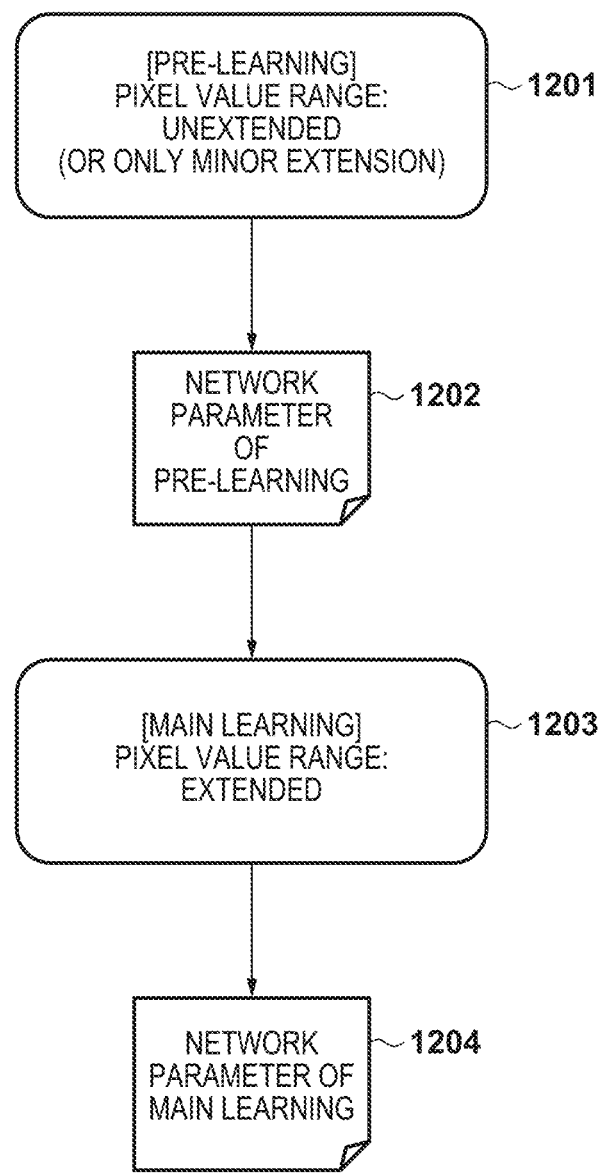
FIG. 12 is a diagram for describing the flow of learning by the CNN according to the second embodiment.

FIG. 12 is a diagram for describing the flow of learning in the present embodiment. The flow of learning will be described below with reference to FIG. 12. In step S1201 of FIG. 12, as the pre-learning by the CNN, the pixel value range extension unit 402 does not extend the downward extension width $\rho_{inf}$ and the upward extension width $\rho_{sup}$ of the supervisory image 803. Note that the pixel value range extension unit 402 may extend the pixel value range of the supervisory image 803 to a lesser extension width than in the first embodiment. Then, in the present embodiment, the CNN is trained using the supervisory image 803 in a similar manner to the first embodiment. Accordingly, with the present embodiment, the CNN can be trained with pixel values corresponding to the central portion of the pixel value range. After the learning by the CNN is complete, the demosaic learning unit 405 outputs the network parameter obtained from the pre-learning.

Next, as the main learning by the CNN, the pixel value range extension unit 402 generates the supervisory image 803 with a pixel value range extended a similar degree to that in the first embodiment, and the demosaic learning unit 405 trains the CNN using the supervisory image 803. At this time, the network parameter obtaining unit 404 obtains the network parameter output via the pre-learning. The demosaic learning unit 405 trains the CNN using the network parameter as the initial value. Accordingly, the demosaic learning unit 405 can improve the inference accuracy of the pixel value of the input image 801 at the upper and lower boundary of the learned pixel value range. Note that the demosaic learning unit 405 may obtain the learned network parameter from the storage unit 104, a storage medium (not illustrated), or the web (not illustrated). The learned network parameter may be obtained via the pre-learning. In other words, in the main learning, the network parameter obtaining unit 404 may use the learned network parameter obtained without executing the pre-learning.

As described above, according to the second embodiment, by using two steps of learning for the CNN, learning of pixel values of an image including the entire region including the upper and lower boundary and the central portion of the pixel value range can be executed. This helps reduce the number of occurrences of artifacts when executing inference. Also, the pre-learning is learning using the supervisory image 803 using an unextended pixel value range making learning easy for the CNN. The main learning is learning using the supervisory image 803 using an extended pixel value range making learning difficult for the CNN. According to the second embodiment, for example, on the basis of a curriculum learning such as two-step learning, the calculation cost can be reduced, and a highly effective artifact suppressing effect can be achieved. Note that the number of steps in the learning is not limited to the two steps described above, and the number of steps may correspond to the number of pixel value range extension widths. Also, in one-step learning, a plurality of steps for dynamically increasing the pixel value range extension width may be set.

As described above, according to the second embodiment, the first image is an image that model has already learned, and a generating unit generates a fourth image with a luminance that differs from a third luminance in a case where the third luminance is greater than the first luminance. According to the second embodiment, on the basis of the first luminance and the fourth luminance of the fourth image, the parameter for learning with the images in the model can be corrected by a correcting unit. Accordingly, color degradation that occurs in the image demosaic process can be suppressed, and the quality of the color in the image can be improved.

Third Embodiment

The differences between the third embodiment and the first and second embodiment will be described below.

Figure 6:
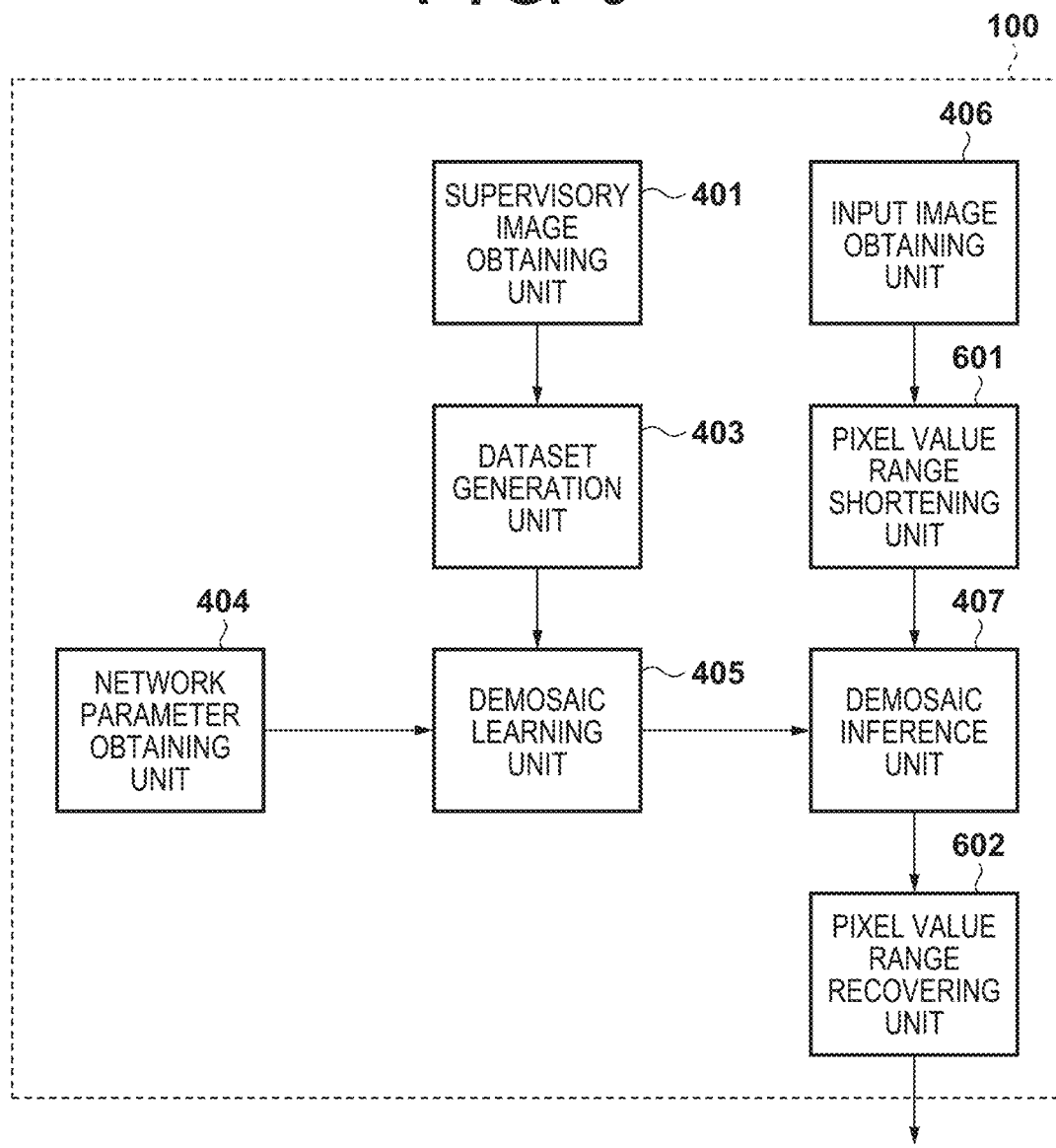
FIG. 6 is a block diagram of an image processing apparatus according to a third embodiment.
Figure 7:
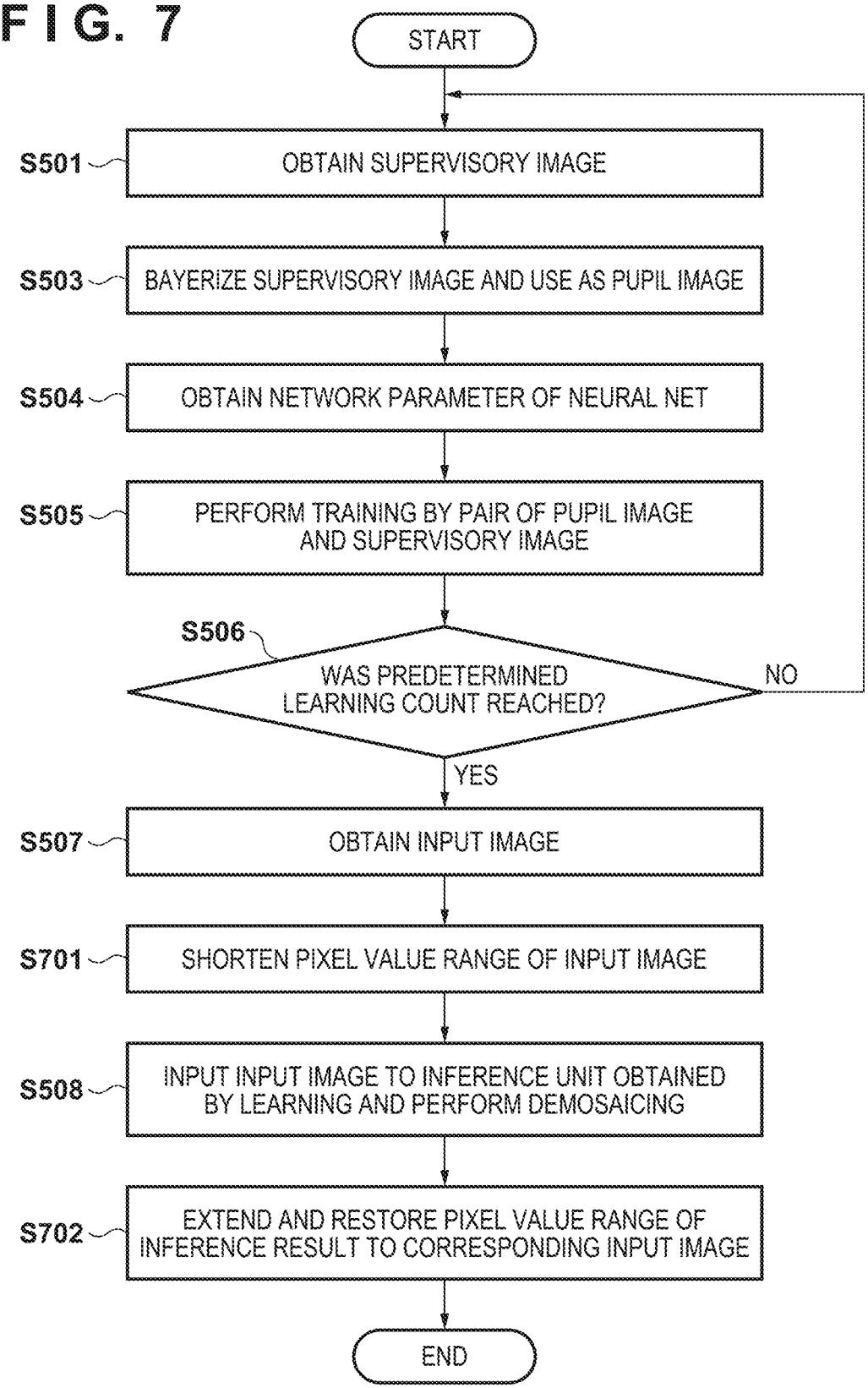
FIG. 7 is a flowchart of an image conversion process according to the third embodiment.

In the first and second embodiment, the pixel value range of the supervisory image 803 used when training the CNN is extended longer than the pixel value range of the input image 801 used when inferring. In the third embodiment, the pixel value range used when learning is not extended, and the pixel value range used w % ben inferring is shortened so that the pixel value range used when inferring is included in the pixel value range used when learning. FIG. 6 is a block diagram illustrating the configuration of the image processing apparatus 100 according to the third embodiment. As illustrated in FIG. 6, the image processing apparatus 100 includes a pixel value range shortening unit 601 and a pixel value range recovering unit 602. The pixel value range shortening unit 601 shortens the pixel value range of the input image 801 obtained by the input image obtaining unit 406. The pixel value range recovering unit 602 recovers the output images inferred by the demosaic inference unit 407 to match the pixel value range before shortening by the pixel value range shortening unit 601. FIG. 7 is a diagram for describing a flow of a series of image processes executed by the functions of the image processing apparatus 100. The configuration of the image processing apparatus 100 according to the present embodiment will be described below with reference to FIGS. 6 and 7.

The present embodiment is different from the first and second embodiment in that the pixel value range of the supervisory image 803 used when learning is not extended at all. According to the present embodiment, the pixel value range used when learning includes a section ranging from a minimum value of 0 to a maximum value of 1, as with the pixel value range 901 illustrated in FIG. 9. In step S701 of FIG. 7, the pixel value range shortening unit 601 shortens the pixel value range of the input image received from the input image obtaining unit 406 using Formula 6. Here, a downward shorten width pw and an upper shorten width $\rho_{sup}$ may be predefined, predetermined values. Herein, the conditions are $\rho_{inf}$<0 and $\rho_{sup}$<0. The pixel value range shortening unit 601 obtains the following result by executing a shortening process on the input image.

As illustrated in FIG. 9, the pixel value range 901 with a minimum value of 0 and a maximum value of 1 is transformed by a shortening process into the pixel value range 903 ranging from a minimum value of $-\rho_{inf}$ to a maximum value of $1+\rho_{sup}$. The pixel value range shortening unit 601 transmits the image including the pixel value range 903 to the demosaic inference unit 407. In step S508, the demosaic inference unit 407 obtains an output image (demosaic image) by inputting the image including the pixel value range 903 into the CNN. The demosaic inference unit 407 transmits the output image to the pixel value range recovering unit 602. In step S702, the pixel value range recovering unit 602 recovers the pixel value range of the output image received from the demosaic inference unit 407 using Formula 9 below.

$$x_{recover} = \frac{x_{demosaicked} + \rho_{inf}}{1 + \rho_{inf} + \rho_{sup}} \quad \text{Formula 9}$$

Herein, $X_{demosiacked}$ is a pixel value range of the output image (demosaic image). $X_{recover}$ is the pixel value range of the output image recovered to the state before shortening of the pixel value range. Formula 9 is the reverse conversion of Formula 6. Formula 9 recovers the pixel value range of the demosaic image to roughly match the pixel value range of the input image obtained by the input image obtaining unit 406. In the present embodiment, the downward shorten width $\rho_{inf}$ and the upper shorten width $\rho_{sup}$ may be determined by selecting from a plurality of shorten widths obtained by changing the shortening ratio of the pixel value range various ways. A method for determining the downward shorten width $\rho_{inf}$ and the upper shorten width $\rho_{sup}$ will be described in detail below.

For example, the supervisory image obtaining unit 401 obtains the RGB format supervisory image 803 and the input image 801 generated by subsampling the supervisory image 803. Next, the demosaic inference unit 407 executes the demosaic process on the input image 801 set with a shortened width for the downward shorten width $\rho_{inf}$ and the upper shorten width $\rho_{sup}$. The demosaic inference unit 407 determines the shortening ratio of the shorten widths on the basis of the degree of occurrence of artifacts in the output image obtained via the demosaic process. The degree of occurrence of artifacts is evaluated against the error average between the pixel value of the output image and the pixel value of the supervisory image 803 at the upper or lower boundary of the pixel value range. In a case where the demosaic inference unit 407 determines that the degree of occurrence (frequency) of artifacts is greater than a specified value, the pixel value range shortening unit 601 shortens the pixel value range by increasing the shorten width of the downward shorten width $\rho_{inf}$ and the upper shorten width $\rho_{sup}$ by 10%.

The demosaic inference unit 407 executes the demosaic process again on the input image 801 with the shortened pixel value range. The shortening process and the demosaic process are repeated a number of times. In a case where the demosaic inference unit 407 determines that the degree of occurrence of artifacts is not greater than the specified value, the pixel value range shortening unit 601 ends shortening of the pixel value range. At this time, the obtained image corresponds to the final output image. Note that the increase ratio for the downward shorten width pi and the upper shorten width $\rho_{sup}$ may not be 10%. The evaluation method for the degree of occurrence of artifacts is not limited to that described above, and a method such as the user directly visually observing and confirming may be used, for example. In the present embodiment described above, the pixel value range of the supervisory image 803 used when learning is not extended, and the pixel value range for the input image 801 used when inferring is shortened. Note that the pixel value range of the supervisory image 803 used when learning may be extended and also the pixel value range for the input image 801 used when inferring may be shortened.

As described above, according to the third embodiment, a fifth image already learned by a model for learning images on the basis of the luminance of the image and a sixth image not learned by the model are obtained, and whether or not a sixth luminance of the sixth image is greater than a fifth luminance of the fifth image is determined. According to the third embodiment, as an image with a luminance different to the fifth luminance, according to the determination result, the sixth image can be generated as a seventh image. According to the third embodiment, a seventh luminance of the seventh image can be estimated by the model including the learning result of the fifth image. Thus, according to the third embodiment, color degradation that occurs in the image demosaic process can be suppressed, and the quality of the color in the image can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-037643, filed Mar. 9, 2021, which is hereby incorporated by reference herein in its entirety.

What is claimed is:

1. An image processing apparatus, comprising:
at least one memory storing instructions; and
at least one processor that, upon execution of the instructions, is configured to:
obtain a model that learns an image on the basis of image luminance, a first image already learned by the model, and a second image not learned by the model;
determine whether or not a second luminance of the second image is greater than a first luminance of the first image;
generate, as an image with a luminance different from the first luminance, according to a result of the at least one processor, the second image as third image; and
estimate a third luminance of the third image using the model including a learning result of the first image,
wherein the at least one processor sets a range of the third luminance on the basis of a frequency that a difference between an estimating result of the at least one processor and the first luminance is greater than specified value.

2. The image processing apparatus according to claim 1, the at least one processor is further configured to:
recover the third luminance estimated by the at least one processor to the second luminance.

3. An image processing method executed by an image processing apparatus that generates learning data for use in machine learning using a model, the image processing method comprising:
obtaining a model that learns an image on the basis of image luminance, a first image already learned by the model, and a second image not learned by the model;
determining whether or not a second luminance of the second image is greater than a first luminance of the first image;
generating, as an image with a luminance different from the first luminance, according to a result of the determining, the second image as a third image; and
estimating a third luminance of the third image using the model including a learning result of the first image,
wherein the generating includes setting a range of the third luminance on the basis of a frequency that a difference between an estimating result of the estimating and the first luminance is greater than a specified value.

4. A non-transitory computer-readable storage medium storing a program that, when executed by a computer, causes the computer to perform an image processing method, the image processing method comprising:
obtaining a model that learns an image on the basis of image luminance, a first image already learned by the model, and a second image not learned by the model;
determining whether or not a second luminance of the second image is greater than a first luminance of the first image;
generating, as an image with a luminance different from the first luminance, according to a result of the determining, the second image as a third image; and
estimating a third luminance of the third image using the model including a learning result of the first image,
wherein the generating includes setting a range of the third luminance on the basis of a frequency that a difference between an estimating result of the estimating and the first luminance is greater than a specified value.

* * * * *